United States Patent Office.

JOSEPH M. LOWENSTEIN, OF NEW ORLEANS, LOUISIANA.

Letters Patent No. 111,357, dated January 31, 1871.

IMPROVEMENT IN FERTILIZING COMPOUNDS.

The Schedule referred to in these Letters Patent and making part of the same.

I, JOSEPH M. LOWENSTEIN, of New Orleans, in the State of Louisiana, have invented certain Improvements in Fertilizing-Compounds, of which the following is a specification.

My invention relates to an improved fertilizing-compound, which is prepared in such manner as to be adapted to various qualities of soil, and consists of a composition formed of night-soil, sulphuric acid, bones or bone-dust, and lime.

I take night-soil in its natural state and prepare it for admixture with the hereinafter-designated ingredients by draining, evaporating, or otherwise expelling the superfluous fluid therefrom, until the mixture is brought to a condition which will admit of ready manipulation.

I then take one or two parts of bone or bone-dust and dissolve it in about four parts of sulphuric acid, and then dilute this solution of bone and sulphuric acid with from four to five parts of water.

I then take about two parts of unslaked lime to one part of the above solution, and slake the lime with the solution of sulphuric acid, bones, and water, and while this mixture is in its greatest caloric condition I take the excrement or night-soil, prepared as aforesaid, and thoroughly intermix it with the solution of sulphuric acid, bones, water, and lime, whereby I obtain a phosphate of lime intermingled with bone and excrement.

My object in working or thoroughly intermixing the component parts during the action of the acid, bones, and lime, is to render the compound friable or as nearly dry as possible.

But should the night-soil not have been properly drained of its fluid parts, and yet retain too much moisture, or should a too great relative quantity have been employed, I then subject the compound to pressure and thereby expel the remaining fluid therefrom.

I do not limit myself to exact quantities of any of the above-named component parts, because my fertilizing-compound is designed to be so prepared, as regards said parts, as that it may be adapted to any and every soil by the increase or diminution of the relative quantity of the substances employed for the intended purpose.

When it is desirable to more thoroughly dry the compound for shipment it may be exposed to the sun or dried in the room of a drying-house.

Claim.

A fertilizing-compound, prepared in the manner described, from night-soil, sulphuric acid, bones or bone-dust, and unslaked lime.

In testimony of this my application for Letters Patent for the above-described invention I hereunto subscribe my name the day and year first above written.

J. M. LOWENSTEIN.

Witnesses:
C. MOORE,
V. D. TENEBOUNE, Jr.